United States Patent
Vazquez

(10) Patent No.: US 6,854,437 B1
(45) Date of Patent: Feb. 15, 2005

(54) CONTINUOUS FLOW EXPANDABLE CHAMBER AND DYNAMIC DISPLACEMENT ROTARY DEVICES

(76) Inventor: Jesus Vazquez, C/Alameda B-13, Sta. Juanita, Bayamon, PR (US)

(*) Notice: Subject to any disclaimer, the term of this patent is extended or adjusted under 35 U.S.C. 154(b) by 0 days.

(21) Appl. No.: 09/173,828

(22) Filed: Oct. 16, 1998

Related U.S. Application Data

(60) Provisional application No. 60/062,225, filed on Oct. 16, 1997.

(51) Int. Cl.[7] .............................................. F02B 53/04
(52) U.S. Cl. ...................................... 123/248; 418/244
(58) Field of Search ................................ 123/223, 237, 123/248; 418/243–248

(56) References Cited

U.S. PATENT DOCUMENTS

| | | | | |
|---|---|---|---|---|
| 650,661 A | * | 5/1900 | Stewart | 123/248 |
| 912,948 A | * | 2/1909 | Ford et al. | 123/223 |
| 1,369,070 A | * | 2/1921 | Williams et al. | 123/223 |
| 2,238,395 A | * | 4/1941 | Nittka | 418/248 |
| 2,821,176 A | * | 1/1958 | Koser et al. | 123/248 |
| 3,176,664 A | * | 4/1965 | Kurose | 123/237 |
| 3,913,534 A | * | 10/1975 | Bratten | 123/248 |

FOREIGN PATENT DOCUMENTS

FR          1055946       * 10/1953      ............... 123/237

* cited by examiner

Primary Examiner—Michael Koczo

(57) ABSTRACT

A revolving piston rotary annular cylinder valved continuous combustion or flow expandable chamber devices, compressor and engine machine system with an outer toroid cylinder housing assembly having a central axis, having one or a plurality of balanced pistons with means for attachment to a rotor and radiating through the outer rotor assembly to contact or come within close tolerance of the interior surface of the outer housing at the other extreme of the pistons, whereby, a plurality of relatively air tight compartments are formed between the interior surface of the outer housing, the outer surface of the rotor assembly and the piston or plurality of pistons with the volume of said compartment varying as a function of the rotative position of the inner cylinder and rotor assembly in relation to the isolating valve.

21 Claims, 15 Drawing Sheets sloped back of piston may extend to
the face or top of the preceding piston

ROTATIONAL SEQUENCE

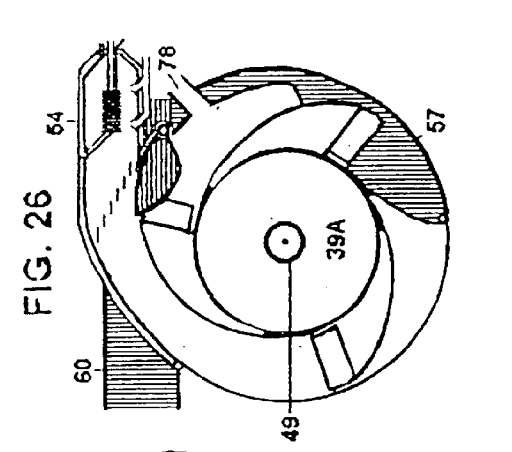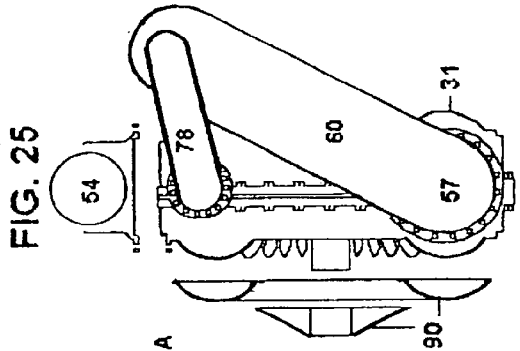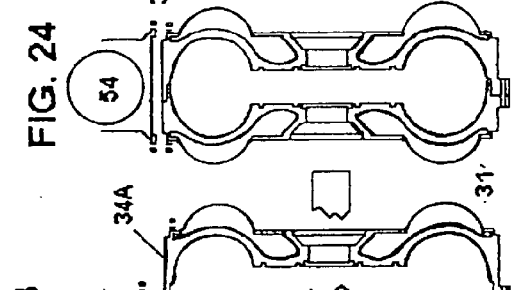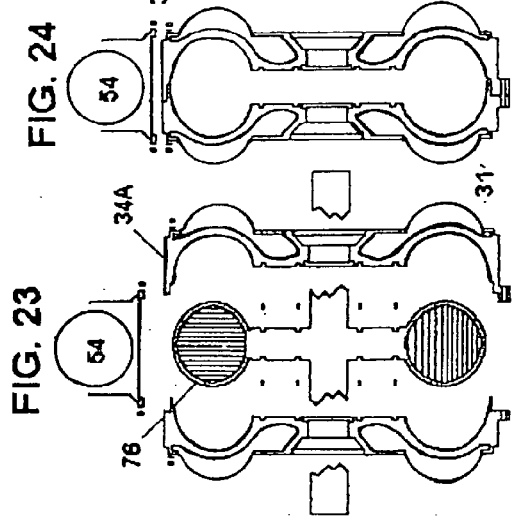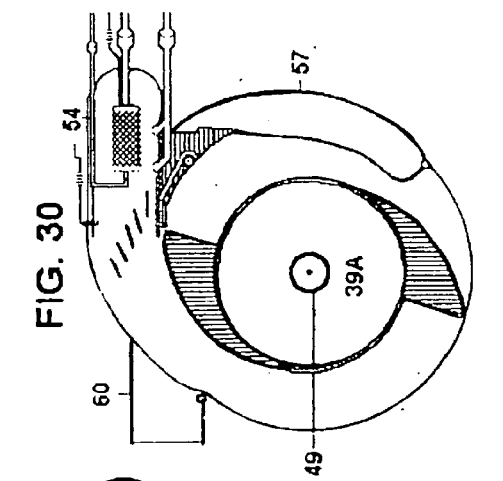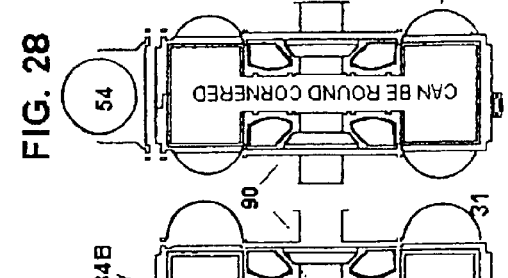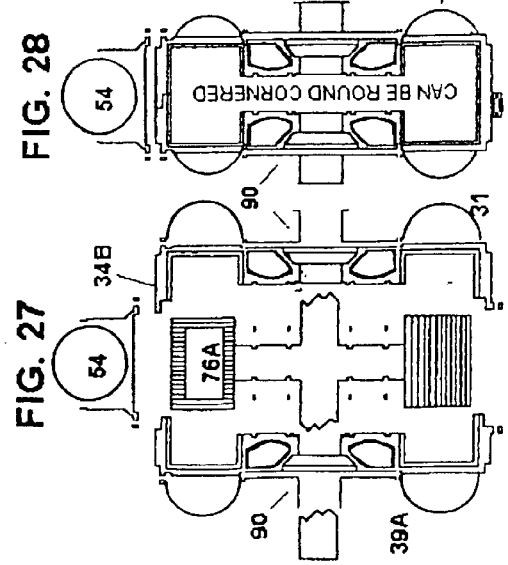

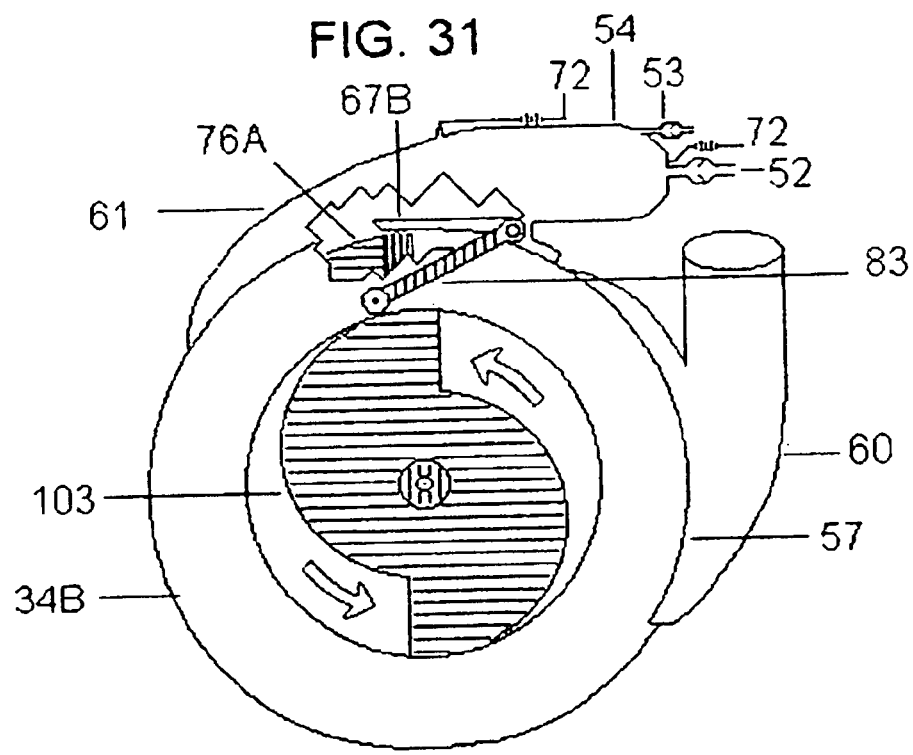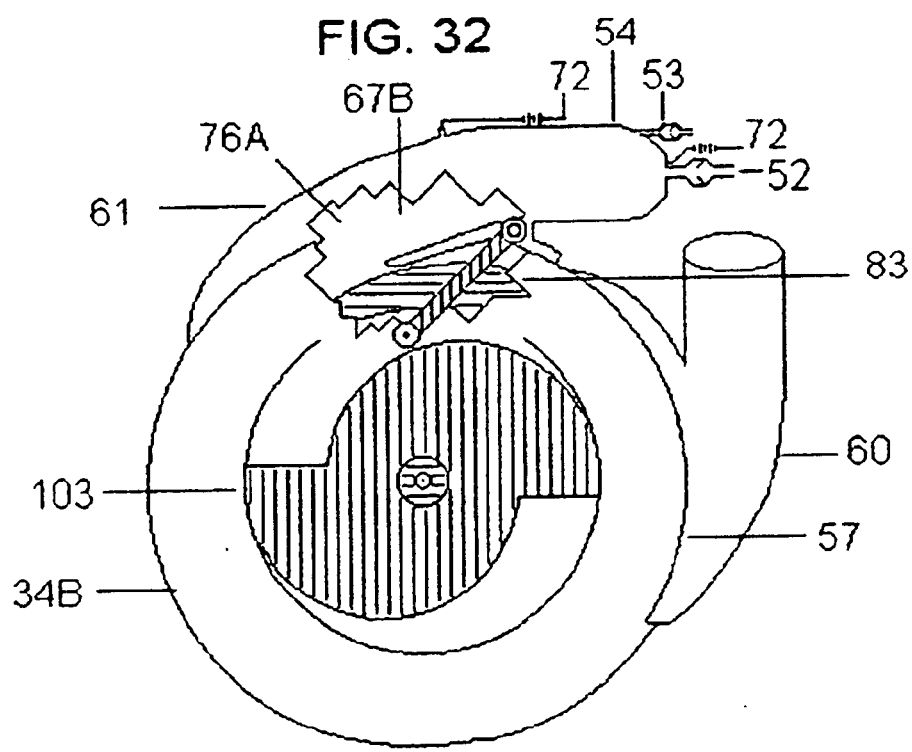

CONTINUOUS FLOW EXPANDABLE CHAMBER AND DYNAMIC DISPLACEMENT ROTARY DEVICES

CROSS REFERENCE TO RELATED APPLICATIONS

This application claims benefit of 60/062,225 filed Oct. 16, 1997.

STATEMENT REGARDING FEDERALLY SPONSORED RESEARCH OR DEVELOPMENT

Not applicable

INCORPORATION-BY-REFERENCE OF MATERIALS SUBMITTED ON A COMPACT DISC

Not applicable

BACKGROUND OF THE INVENTION

1. Field of the Invention

This invention in its embodiment as an internal combustion engine would be the first truly significant new rotary internal combustion engine design since the invention of the Otto cycle engine by the German engineer, Nikolaus August Otto in 1861. This was followed by the invention of the diesel engine by the German engineer, Rudolf Diesel in 1896. Both of the latter are still basically the same design; four and two cycle reciprocating pistons. These two men changed the form of transportation for the entire world. Then came the Wankel off center rotary engine (not a true rotary) where the piston is basically a round cornered triangle but still a four cycle engine, invented by the German, Felix Wankel in 1954. Prior to Mr. Wankel, the Englishman, Mr. Frank Whittle invented the jet turbine engine in 1930. The Revolving Piston Valved Dynamic Displacement Expandable Chamber Device embodied as an internal combustion engine overcomes the limitations of gasoline as a fuel and combines the positive displacement of the conventional Otto cycle engine with the dynamic effect of a jet turbine engine yielding high torque at low and high rpm. This device is a new technology that would not displace the current fuel supply infrastructure (it would utilize ordinary gas stations). With the steam power assist unit this engine would be the most adiabatic engine to date. This engine could better utilize available fuels including renewable fuel sources.

2. Objects and Advantages

A. This engine is more efficient for the following reasons:

1. It is perfectly rotary (unlike the Wankel engine).
2. It combines the positive displacement of a conventional internal combustion engine with the dynamic effect of a jet turbine engine hence the term Dynamic Displacement.
3. Utilizes, does not waste low pressures (contrary to the minimum pressure required by a turbine.
4. Does not utilize a reciprocating motion that wastes energy changing directions (momentum, impetus, inertia).
5. Does not waste energy in cycles such as the four (4) and two (2) cycles of the conventional Otto, Diesel or Wankel engines. In the four (4) cycle engine only one (1) out of four (4) cycles provides power.
6. Does not waste power on a compression cycle.
7. Does not waste power on conventional cam shafts.
8. Does not waste power on conventional valves and springs.
9. Can function without a starter.
10. It can utilize excess heat that would normally be wasted (steam power assist and Thermoelectric devices). In conventional engines the radiator wastes 33% of the fuel=s energy (more adiabatic).
11. Utilizes turbo charger(s) to supply oxidizer (air).
12. Utilizes electric fuel pump.
13. Utilizes flywheel effect.
14. Can utilize ultra high efficiency lubricants permanently bonded to critical surfaces with coefficients of friction of only 0.001 as opposed to the conventional 1.0.
15. The possible combinations of various versions that increase efficiency.
16. Design permits the complete control of ratios of fuel to air.
17. Can be combined with electric motor/generator in a hybrid configuration.
18. Because of the nature of the combustion there is no such thing as detonation, piston knock or pre-ignition. This engine compensates for the deficiencies or limitations of gasoline as a fuel. These being: ratios of air to fuel, its relatively low octane content and the tendency for gasoline to produce detonations, piston knock or pre-ignition.
19. Can use many types of fuel.
20. Utilizes gasoline more efficiently.

B. This engine is more durable for the following reasons:

1. Simple design, less moving parts, smaller, lighter, oblique angles.
2. Rotation only in one direction avoids wear caused by changing directions (180 degrees) on the parts. Reciprocating action tends by its nature to hammer the following parts: connecting rods, rings, bushings, bearings, cam shafts, cams, cylinders, pistons, crank shafts, etc.
3. Permits superior design and function of the piston rings because of one way rotation.
4. Less vibration.
5. Utilizes ultra high efficiency lubricants permanently bonded to the critical surfaces.
6. Forms strong components geometrically designed for maximum strength (toroids and cones).
7. Controlled operating conditions of the critical parts.
8. Can utilize new materials such as carbon carbon composites that can resist higher temperatures yet do not expand as much as metal permitting smaller tolerances at the same time being stronger and more malleable.
9. Because of the nature of the engine and its form of combustion there never is ping, piston knock or detonation. These being potentially the most destructive for a conventional engine. Piston knock or detonation is a form of abnormal combustion, hot gases left over from the previous combustion spontaneously detonate. This knock produces a spike of ultra high pressure, a shock wave that can break pistons or rings and radically increase combustion chamber temperature. This increases the possibility that red-hot glowing metal in the combustion chamber will result in pre-ignition, at which point successive combustion events are ignited not by the spark plug, but by the hot spots. Timing is then completely out of control, leading to further temperature rises and the possibility of melted pistons etc.

C. This engine is easier to manufacture for the following reasons:

1. The toroid cylinder is manufactured in two halves, then is put together with gaskets and bolts etc.
2. The water jackets are manufactured and put together in the same way as the cylinders and bolted on over the latter.
3. The design is simple.
4. Can utilize new materials and simplified methods.
5. Would be more economical to manufacture.
3. Description of Related Art
Not applicable

BRIEF SUMMARY OF THE INVENTION

This invention in its internal combustion mode is more efficient due to the following reasons: It is a rotary engine in its purest form. It does not waste energy in useless vibration caused by off center rotation. It runs on a single cycle; that is, there is no compression cycle, no separate exhaust cycle and no separate intake cycle. Just basically one cycle that does most of the above at the same time. This engine can use almost any kind of combustible liquid or gas, even adding water to certain fuels would function. This engine overcomes the limitations of gasoline as a fuel while being more efficient in its use. This invention is more durable due to its simple design with very few moving parts (only two in its basic configuration). This invention is also easier to manufacture because it can be made stamped or cast in two halves, then bolted together or joined in some other way. Making it not only easier to build but also more economical. The invention can be used in many ways. The following is a list of and function of some of its embodiments. Its embodiment as a very efficient internal combustion engine is well documented in these pages, so I will go on to mention some of the others. One of its versions in its internal combustion engine embodiment is that of an air breathing engine. That is an engine that sucks in the air that it will utilize for combustion rather than having the air forced in by some other external mechanical means. In this version, the engine becomes a cycled engine in which not every passing of the piston is imparted by power but rather every other and the spark is timed in a manner as to coincide with this cycle, see FIG. 21. This is one of various versions of this type of air breathing engine. In its embodiment as a pump, as illustrated in FIG. 8, this embodiment can be made in many ways. FIG. 8 shows the invention in a two square piston and cylinder configuration with a reversed valve (67). In other versions of this pump the valve need not be reversed. It can be double, it can have one or a plurality of pistons and rotors and may or may not include a one way pressure valve (66A). It can come in all sizes from nano or micro to macro or gigantic and it can be manufactured of any material that is suitable to its ultimate purpose (metal, ceramics, composites, etc.).

The valve(s) in the designs of the pump embodiments, open and close allowing the passage of a piston yet isolating it and the working fluid from the exhaust manifold insuring that it does its work and flow only in one direction. Imparting power to the axle shaft will cause the rotor with the attached balanced pistons to turn. The inlet would draw the working fluid into the expanding chamber. Once the working fluid is drawn into the chamber it is compartmentalized and sealed in by the following piston which delivers it to the exhaust port where the valve(s) purge or force it out of the device. FIGS. 6, 8 and 8A function in this manner. The embodiments of the steam engine, the water engine (for hydroelectric and other purposes), the fluid metering devices, the power assist devices and the quantum motors would function in the same manner except that the working fluid would supply the force or pressure to move the piston(s) and the rotor and the rotational power would be derived from the shaft rather than be delivered to it as in the case of the pump. The valve with means for controlling said valve so that as the revolutions increase and the load decreases the valve will start to assume a less obstructive position. From opening and closing completely to a kind of rhythmic flutter or waving in tune to the passing of the pistons and acting as a fluidic amplifier until balance can be reached and maintained at which point the valve may attain a fully unobstructive position until when load increases or revolutions decrease for any reason then the valve can readily reengage and assume full range movement or operation. As with all the valves in any embodiment of this invention they can be actuated by many means they can be spring loaded, cam and lever actuated with or without a controlling governor, electrically, pneumatically, hydraulically or mechanically actuated with electronic controls or other type controls In these illustrations the rotor and piston rotation is generally in a clockwise direction but in actuality may not be limited to this.

The above variations and variations not mentioned above whether in size, materials, embodiments and functions, represent the invention in all of its actual and potential manifestations.

BRIEF DESCRIPTIONS OF SEVERAL VIEWS OF THE DRAWINGS

FIG. 1 is a schematic isometric front view of one type of the Revolving Piston Valved Dynamic Displacement Expandable Chamber Device in a circular/circular (round) version of the toroid cylinder assembly 34A which represents the basic structure of the larger size embodiments of the invention, smaller sizes might simply be cast or stamped in one piece. This invention in its embodiment as an internal combustion engine, a version of which is represented by combining FIGS. 1, 2 and 3 which demonstrate the following: fuel is supplied by a high pressure fuel pump through the fuel supply lines with check valves 53 and the regeneratively cooled/heated fuel supply turbinals to the inner reaction cage 65 within the combustor 54 which is attached to the toroid cylinder assembly 34A, where it is impinged upon (preferably from the opposite direction) and mixed with air from the primary inner air supply lines with check valves 52 supplied by a supercharger 71 and/or a turbocharger 82 or even the inventions embodiment as a pump in this case an air pump FIGS. 5, 8 and 8A then ignited by a spark/electrode 72 (see FIG. 9) within the reaction cage 65. At this point the mixture is considered rich to guarantee ignition. Once the combustion exits the inner reaction cage 65 it is mixed further with air that is supplied by the secondary air supply lines with check valves 51 and leaned out further enhancing combustion and minimizing the creation of hydrocarbons. At this point the combustion gases may flow through a diffuser 62 and through the combustor accumulator by-pass neck 61 and onto the piston top 58 with enhanced rings 58 in position to receive it forcing said piston forward as the valve 56 in its closed position prevents the retrograde exiting of gases and at the same time guarantees rotational direction. The gases continue expanding and pushing the piston 58 forward until it reaches the exhaust port 57. The position of the exhaust port 57 on the toroid cylinder assembly 34A is determined by the number of pistons 58 on the rotor 39a needed to achieve dynamic balance. Once the piston 58 reaches the exhaust port 57 the piston 58 following it will simultaneously reach the top seal point 59 and the cycle will repeat itself. As the piston 58 reaches the exhaust port 57 and the exhaust empties into the exhaust manifold 60 it may power a turbo charger 82 and/or contain another water cooled diffuser that further extracts heat from the flow in order to supply supplemental steam power or for thermoelectric extraction. At this point an Electrogasdynamic device (EGD from MHD) may be added under certain conditions to produce electric power.

FIG. 4 functions in the same way as the previous only that it is in the rectangular configuration as it would function in any shape be it oval or triangular etcetera.

FIG. 5 also in a rectangular configuration would function in a similar way the only difference being the engine=s position relative to the others. With the combustor 54 facing vertically the effect of gravity on the valve 67 can be practically eliminated.

FIG. 6 in most aspects like the previous versions only that this version has a double valve 67A air lock type configuration that assures an even better lock out of retrograde exhaust flow.

FIG. 7 same double valve 67A as FIG. 6 only in a rectangular torus 34B configuration.

FIG. 8 is the invention in one of its embodiment as a pump the main differences here being the lack of a combustor 54 replaced by inlet 75 and a reversed valve 67 that is a valve that faces and opens toward the rotation of the pistons 76A and rotor 39A riding or rolling on said rotor and sloped back pistons 41 thereby decreasing the chamber volume and forcing the air or water etc. to exit exhaust port 57 and exhaust manifold 60 until valve 67 closes the exhaust manifold 60 may contain a one way low pressure valve 66A.

FIG. 8A is the same basic design and function as FIG. 8 except that valve 67 does not seat and close completely against the interior of rectangular toroid cylinder assembly 34B allowing working fluid or air to pass by more dynamically utilizing the accumulator by pass neck 61 the pressurized fluid or air is then trapped the one way low pressure valve 66A.

FIG. 9 is similar in basic design to the previous versions of round torus internal combustion engine version except that it shows additionally an exhaust purge tube 78 that connects to the exhaust manifold 60. Oil 79 and water 87 lines feed through the axle shaft 49 separately and into the rotor 39A and piston heads 76. The oil then seeps out between the piston rings 58 and in again through the oil inlets 79 to be pumped down to the oil cooler 99 to be recirculated. The coolant or water is routed through the piston 76 and returned to be cooled and/or its steam to be collected. Also shown is a water cooled diffuser/steam generator 62, a steam or water recovery tube 88 and a stylized turbo charger 82 in the exhaust manifold 60. The combustor 54 generates the gases that move the pistons 76 and utilizes a turbinal regenerative cooler/heater 64 that vaporizes the fuel while cooling the combustor 54. Also this version may utilize a pivoting water cooled valve 56 and valve pivot and water inlet 86.

FIGS. 10, 11, 12, 13, 14 and 15 represent the rotational sequence of the rotor 39A and pistons 76A in relation to the position of the valve 67 in most embodiments of the invention.

FIG. 16 is a isometric schematic front edge on view of a version of the invention in its round piston cylinder 76 configuration in which a different angle of the oil 100 and water 92 reserve compartments is illustrated and their distribution through the axle shaft 49, rotor 39A and through their various routes from reservoir through their design function, through their respective cooling processes oil 99 and coolant or water expansion chamber 97, radiator and fan 96, thermoelectric condenser 94 and back again. Also shown is the way the combustor 54 is attached to the toroid cylinder 34A. This compound compartmentalized version is one of various configurations.

FIG. 17 is a rendition of the invention in its embodiment as an internal combustion engine. It clearly shows the basic process that powers this engine. Additionally it shows the fresh air/exhaust tube 68 which allows a type of conditioning of the piston 76 and cylinder area 34 prior to its cycling back to its combustion position. It also show a hot water or steam recovery line 88. In summary basically what this figure shows is the way that the combustor 54 drives the piston 76, is isolated from the retrograde flow by the valve 56 and is exhausted through the exhaust port 57 and manifold 60.

Figure 21:
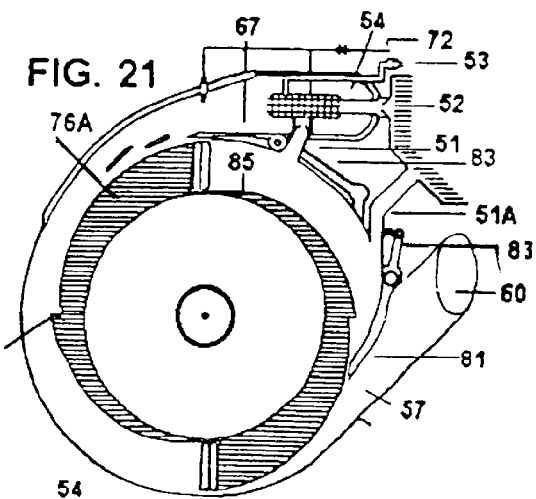

FIG. 21 is also in an internal combustion embodiment except that this version is an air breathing or sucking version meaning that this version is not force fed air as the other continuous combustion models. As a consequence this model cycles between detonations in order to supply itself with the fresh air necessary for combustion. Additionally this model is also a double valve 67 & 81 version in which the exhaust purge valve 81 faces the opposite direction from the traditional piston isolating valve 67 in this version as well as in others.

As the piston 76A cycles around as shown in this figure the exhaust purge valve 81 and the valve 67 create a partial vacuum causing secondary air intake with check valves 51A to draw air into that space. The continuing rotation and the closing of valve 67 cause air to be forced through the secondary air supply line with check valves 51 and into the combustor 54 combining with fuel in the inner reaction cage. At the same time the preceding piston 76A is expanding the chamber outside the area isolated by the two valves drawing in air through the primary inner air supply with check valves 52 mixing it with fuel within the inner stratified flashover reaction cage 65. At this time the spark plug/electrode 72 flashes and the mixture is ignited forcing the rotor 39A and pistons 76A to turn. This turning evacuates the exhaust gases through the exhaust port 57 and manifold 60 initiating the process all over again.

Figure 22:
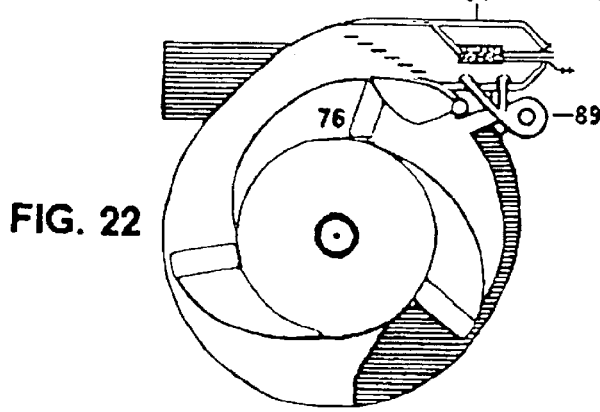

FIG. 22 the only difference in this embodiment of the round toroid cylinder engine is that it has a small turbocharger 89 that runs off of the purged exhaust gases to draw in fresh air to supplement the air in the combustor 54 for combustion.

FIGS. 23, 24, 25 and 26 are different views of the same engine and indicate that it is a round air cooled toroid cylinder with optional covers 90 that would either concentrate heat for steam generation or for converting it into a water cooled version and FIG. 25 also helps one visualize what the exterior of this engine would look like.

FIGS. 27, 28, 29 and 30 illustrate the same as FIGS. 23, 24, 25 and 26 except in a rectangular toroid version with an extended exhaust port 57 eliminating the need for a purge tube 78.

FIG. 31 is an isometric side view of the invention in one of its preferred embodiments as an internal continuous combustion engine with a cut away view if the inner valve 67B, combustor 54, upper toroid cylinder area, valve control lever actuator with roller 83, its cam 103 and exhaust attachment 60. Additionally the image shows the piston 76A and the combustion isolating inner valve 67B of the expandable chamber or cylinder 34B in the open position and in the process of allowing the piston 76A to pass and about to close as also illustrated by the position of the external actuator lever 83 on the cam 103.

FIG. 32 is the same as FIG. 31 except that it shows the valve 67B closed and climbing over the sloped back of the following piston 76A as said piston on the rotor rotates on its axis it also shows the position of the valve control lever and roller 83 on a different position on the cam 103 that corresponds to the position of the valve 67B. The valve's 67B action may be at times described as skimming over the rotor and pistons 76A.

Figure 33:
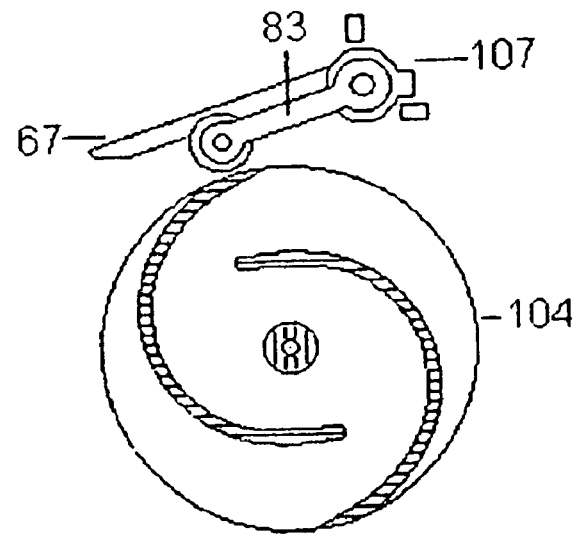

FIG. 33 Is an isometric side view of a valve control cam device best described as a rigid simpler lighter cast, formed or machined cam 104 with a valve actuator lever and roller 83 attached to a valve pivot assembly with pivot stops 107.

Figure 34:
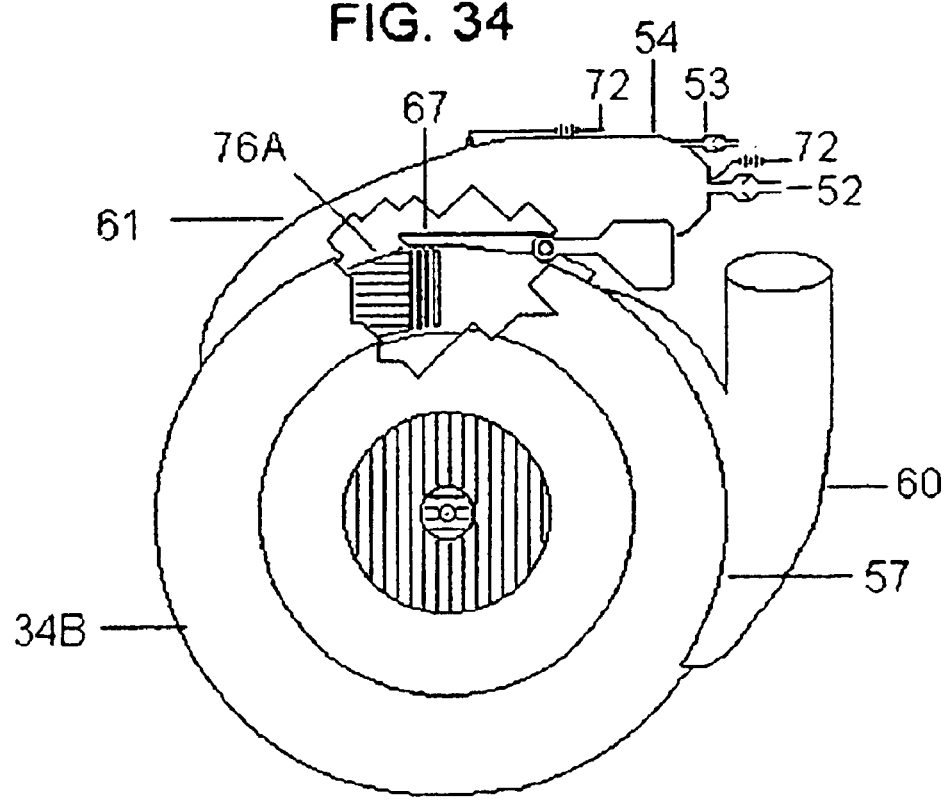

FIG. 34 is an isometric side view of the invention as in FIG. 31 except that the inner valve has no external control and is externally counterbalanced the valve 67 floats freely always subject to downward closing force of combustion or flow (may also be spring loaded) and the upward push of the passing sloped piston back 76A and/or rotor. The very nature of this unique design and its function allows the device to work efficiently.

Figure 35:
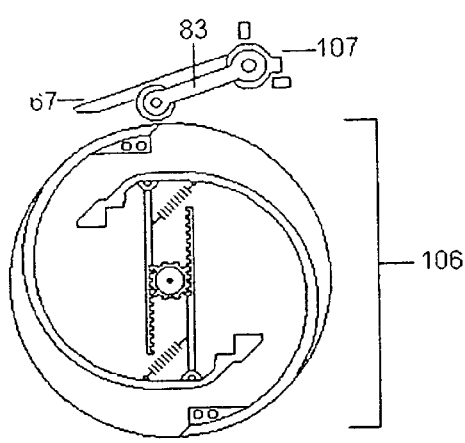

FIG. 35 is an isometric side view of the flexible spring loaded shape changing governor type external control 106 for internal main valve 67 in full relaxed position that in turn forces the valve to fully open and close and function in a similar fashion to a regular cam 103 and allowing the valve 67 to close filly at lower revolutions for maximum torque also the valve control lever with roller 83 and valve pivot stops 107.

Figure 36:
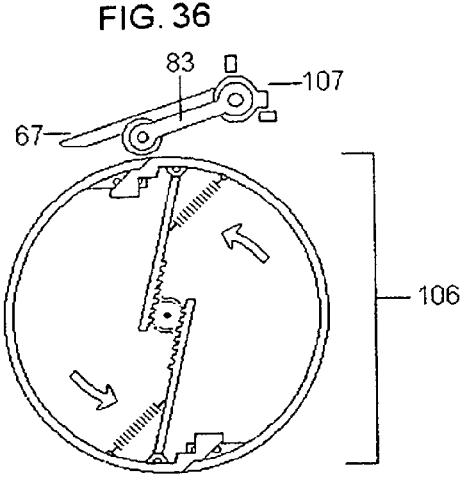

FIG. 36 Also an isometric view that depicts the same flexible spring loaded shape changing governor type external control of FIG. 35 for internal main valve 67 in fill extended position which in turn keeps the internal valve 67 open this control 106 at high revolutions utilizes centrifugal force to attain and maintain it's spherical shape as well as limitless shape increments in between thereby controlling the internal valve 67 through all changes in the speed of the revolutions permitting said valve 67 to open and close in the most efficient manner relative to the inventions speed minimizing its range of motion yet remaining unobstructive to the passing pistons while preventing the flow or combustion from taking a retrograde course to the exhaust before doing its work allowing for said valve to work as a fluidic amplifier. This type of external control for said internal valve allows for many increments in the position or shape of the cam that controls the lever that controls said valve allowing said valve to open and close to the extent necessary in order to maintain the load at any particular speed of revolutions of the invention also shown are valve control lever with roller 83 and valve pivot stops 107.

Figure 37:
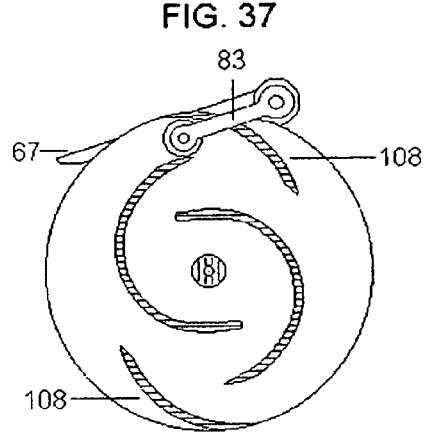

FIG. 37 is an isometric side view of an apparatus similar to the device in FIG. 33 (104) except that it has additional rigid inverted cam ramps 108 that force the roller and control lever 83 of the valve 67 in an opposite and downward direction causing the inner valve 67 to close.

DETAILED DESCRIPTION OF THE INVENTION

Figure 1:
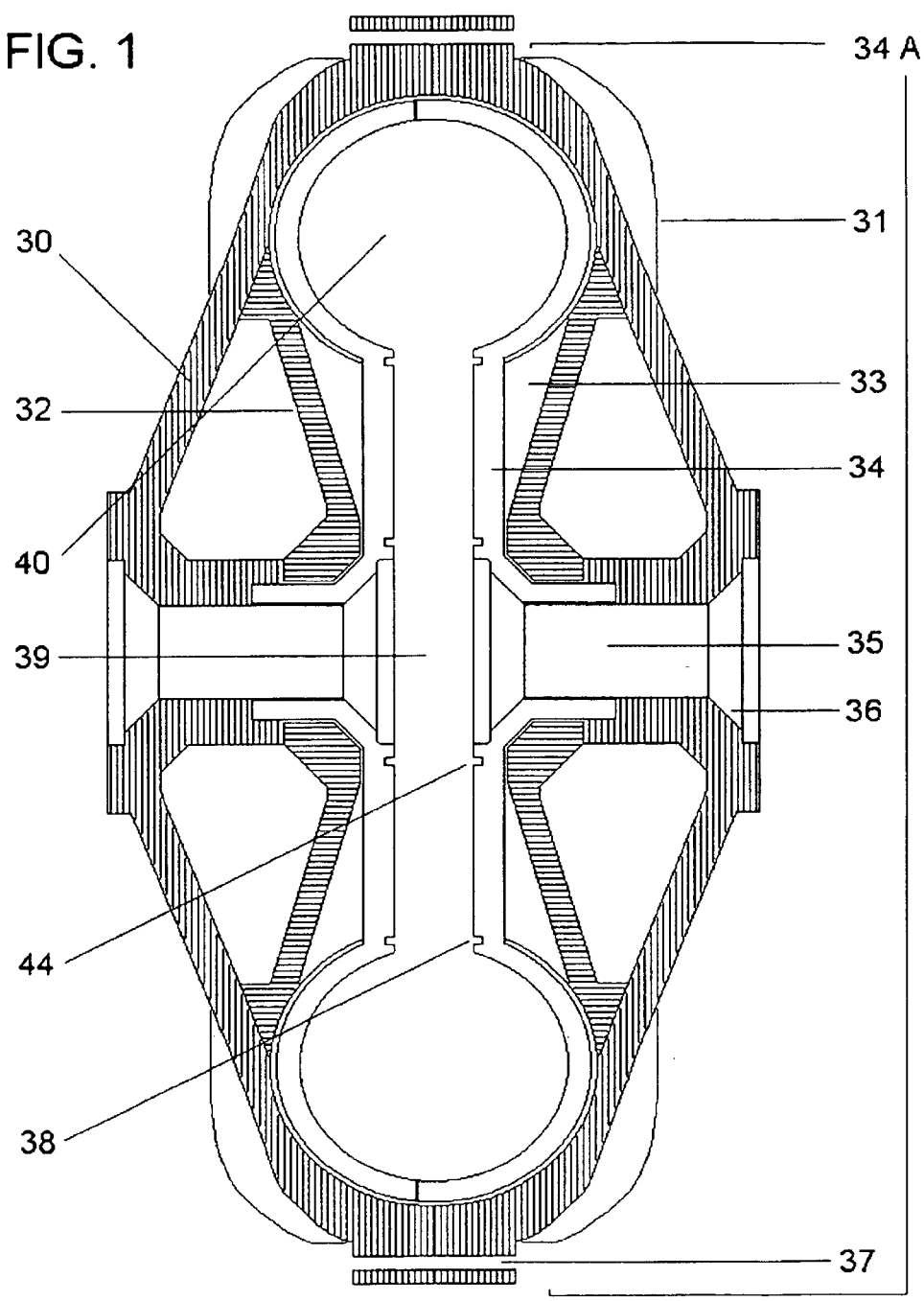
Figure 2:
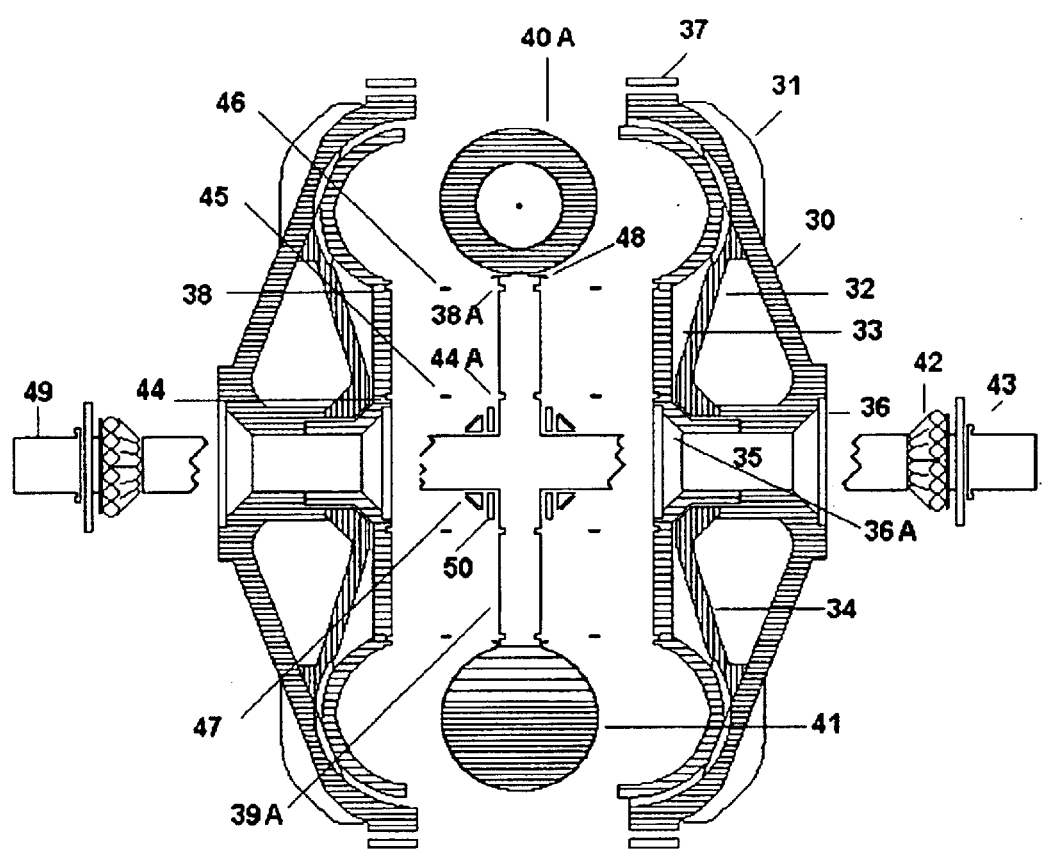
Figure 3:
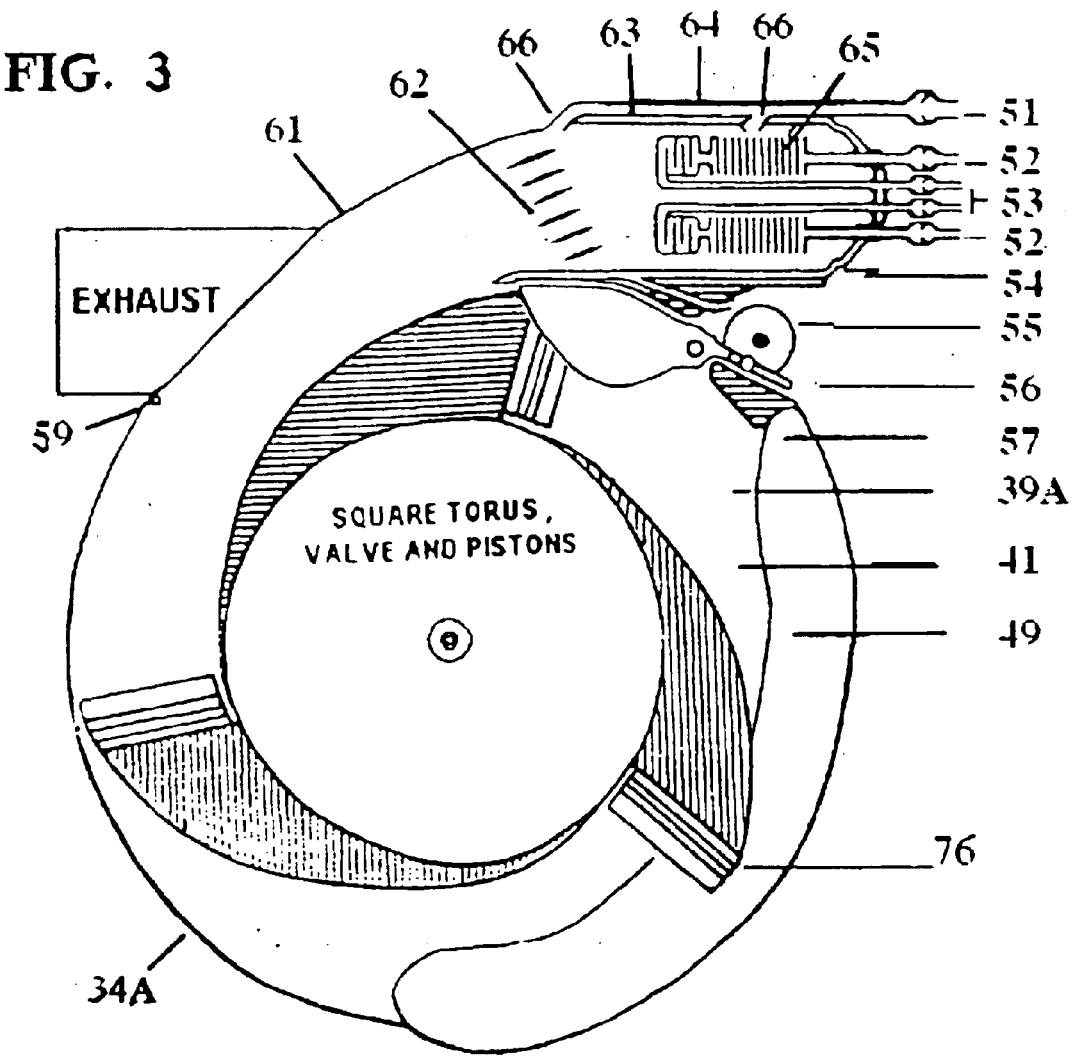
Figure 4:
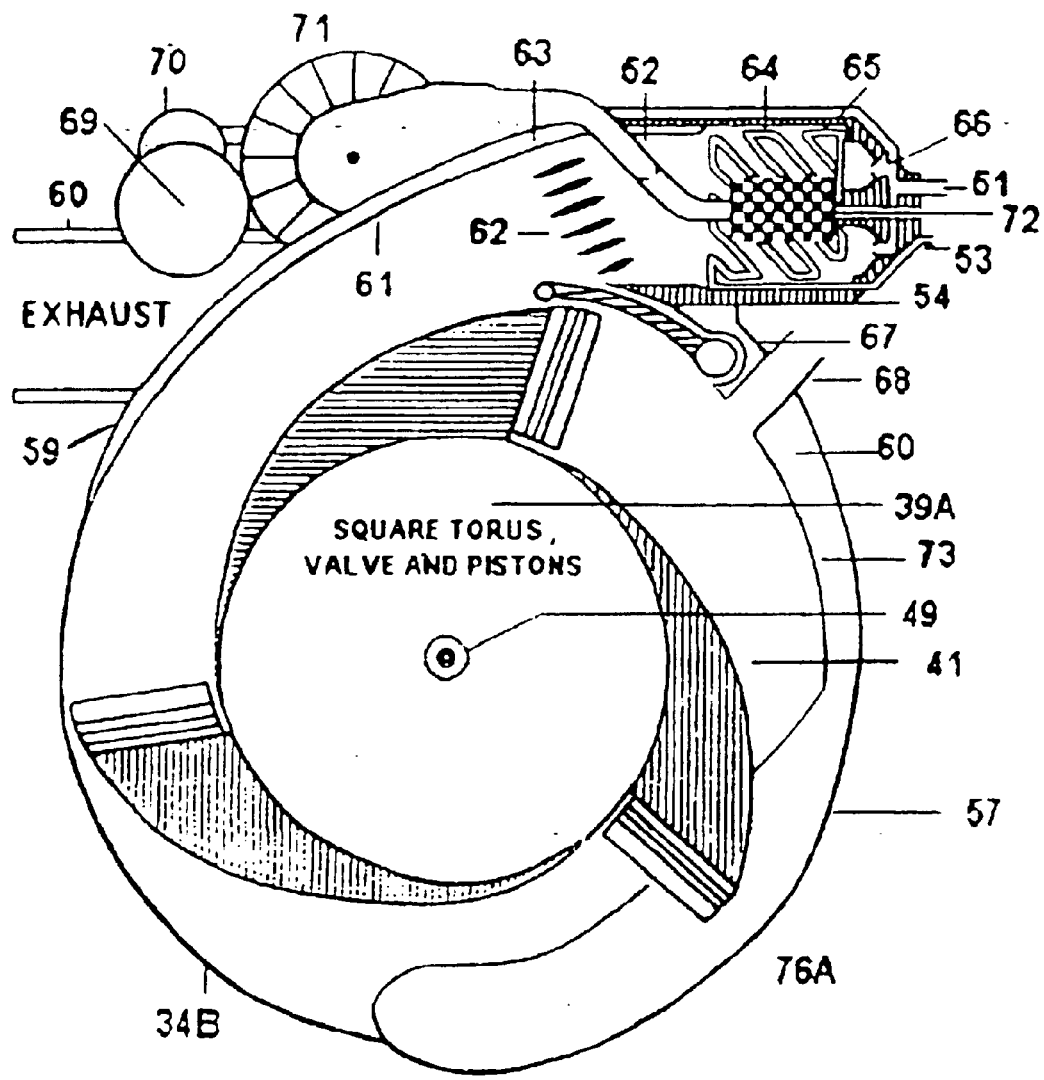

The circular/circular (round) toroid cylinder assembly 34A in FIG. 1 represents the basic structure of the larger size embodiments of the invention, smaller sizes might simply be stamped or cast in one piece. In FIG. 1 the external support convex conical structure 30 and the ribbed external support heat transfer structure 31 can be one piece also the perimeter bolt holes 37, the outer bearing bevels 36 and part of the axle shaft area 35 are part of this structure. The internal support concave conical structure 32 can be made in one piece along with the ribbed internal support heat transfer structure and water jacket element 33. The internal toroid cylinder structure 34 has a smooth inner surface and comprises the piston cylinder area 40, the rotor area 39, the outer 38 and the inner 44 ring seal grooves, the inner bearing bevels 36A and part of the axle shaft area 35. Referring to FIG. 2 and supplemental to FIG. 1 the concave piston face 40A, the piston sloped back 41 attached to the rotor 39A which is attached to the axle shaft 49 supported by the two inner 47 and two outer 42 bearings who are in turn held in place by the retainers 43 and 50. The outer rotor seal 48 protects the outer ring seal 46 which in turn surrounds the inner ring seal 45. FIG. 3 is one of the preferred embodiments of this invention an internal combustion engine in the torus 34A, piston(s) 76 and valve(s) 56 or configuration with appropriate actuator lever 55 or 83, valve 56 actuator 55, pistons 76 and combustor 54 attached to the cylinder 34A, top seal point 59. The combustor accumulator by pass-neck 61 attached to the combustor 54 comprising a diffuser 62, double inner reaction flashover cages 65 with fuel regenerative turbinal heat exchangers 64, primary inner air supply lines with check valves 52 secondary air supply lines with check valves 51 and fuel supply lines with check valves 53 all supply lines with combustor intake low pressure valves 66. Also attached at a position determined by the number of pistons in order to achieve dynamic balance or one piston reaching top seal point as the previous one reaches the exhaust port is the exhaust port 57 and exhaust manifold 60. FIG. 4 also a preferred embodiment of the invention as is FIG. 3 an internal combustion engine only this version is of a rectangular torus 34B, piston(s) 76A and valve(s) 67. Also shown fresh air exhaust purge 68 connected to cylinder 34B, piston roller 73 on piston tips 76A. Also in this figure primary air supply 52 is connected to supercharger 71 and reserve air pressure tank 69 connected to 12 volt electric air pump 70 all of which seems to rest on combustor water jacket 63 and lastly for this figure attached to the combustor 54 and leading into the inner stratified flash over reaction cage 65 is spark plug/electrode 72.

Figure 5:
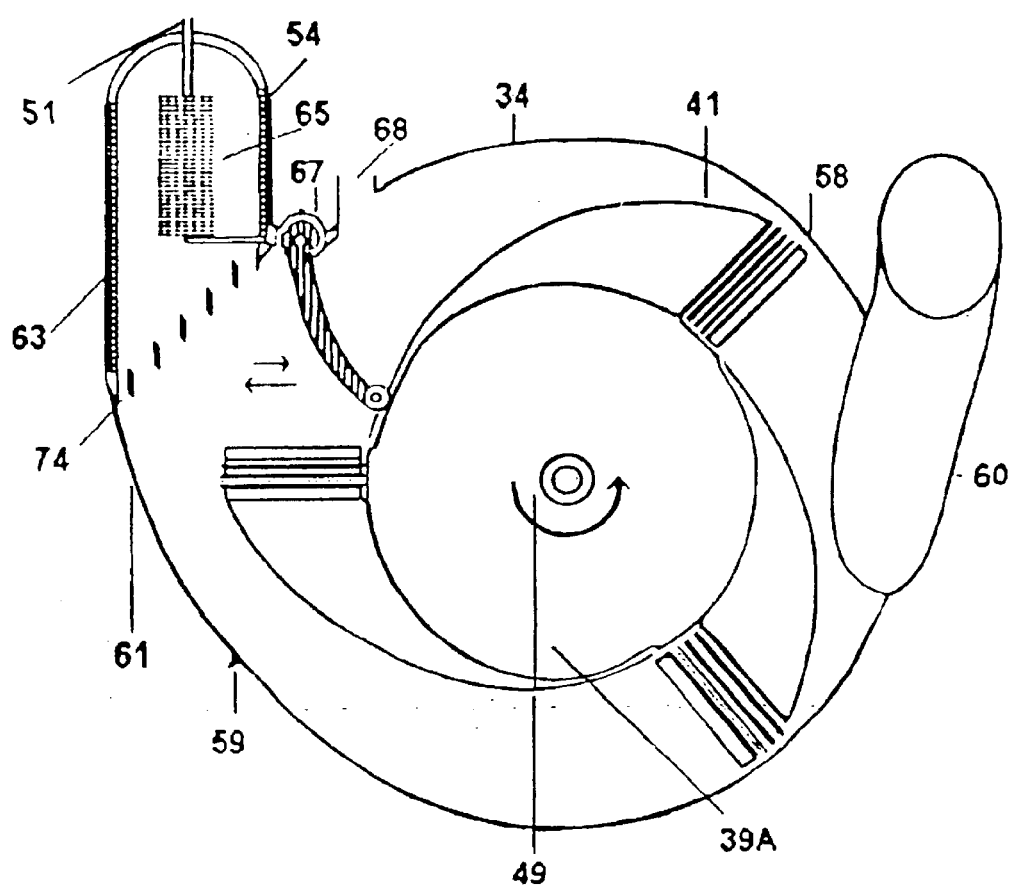

FIG. 5 the engines position is what mainly differentiates it from FIG. 4 also included is the hybrid diffuser/auxiliary air/water cooled steam generator.

Figure 6:
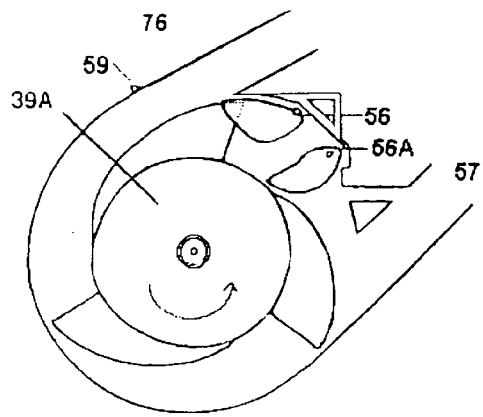
Figure 7:
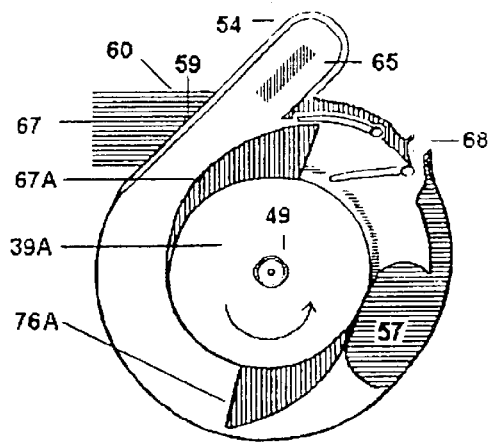
Figure 8:
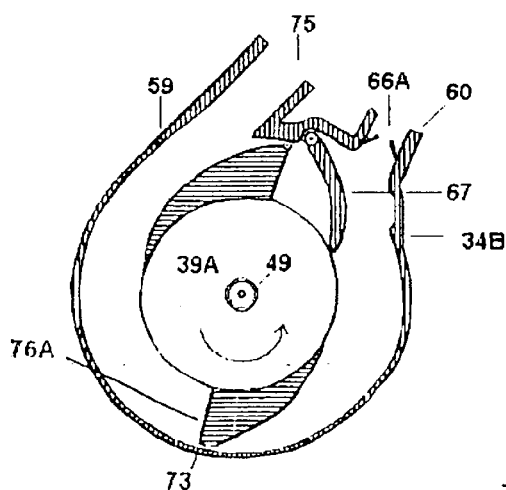
Figure 8A:
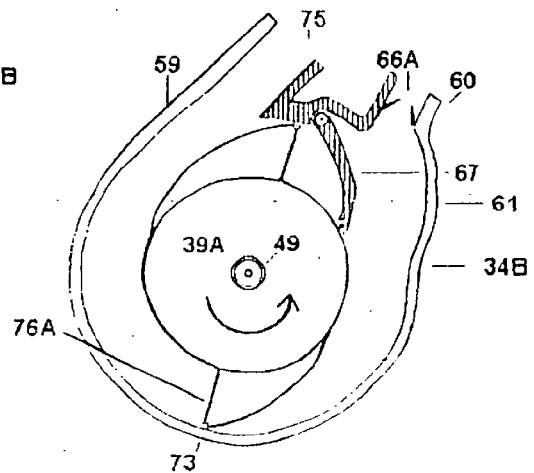
Figure 9:
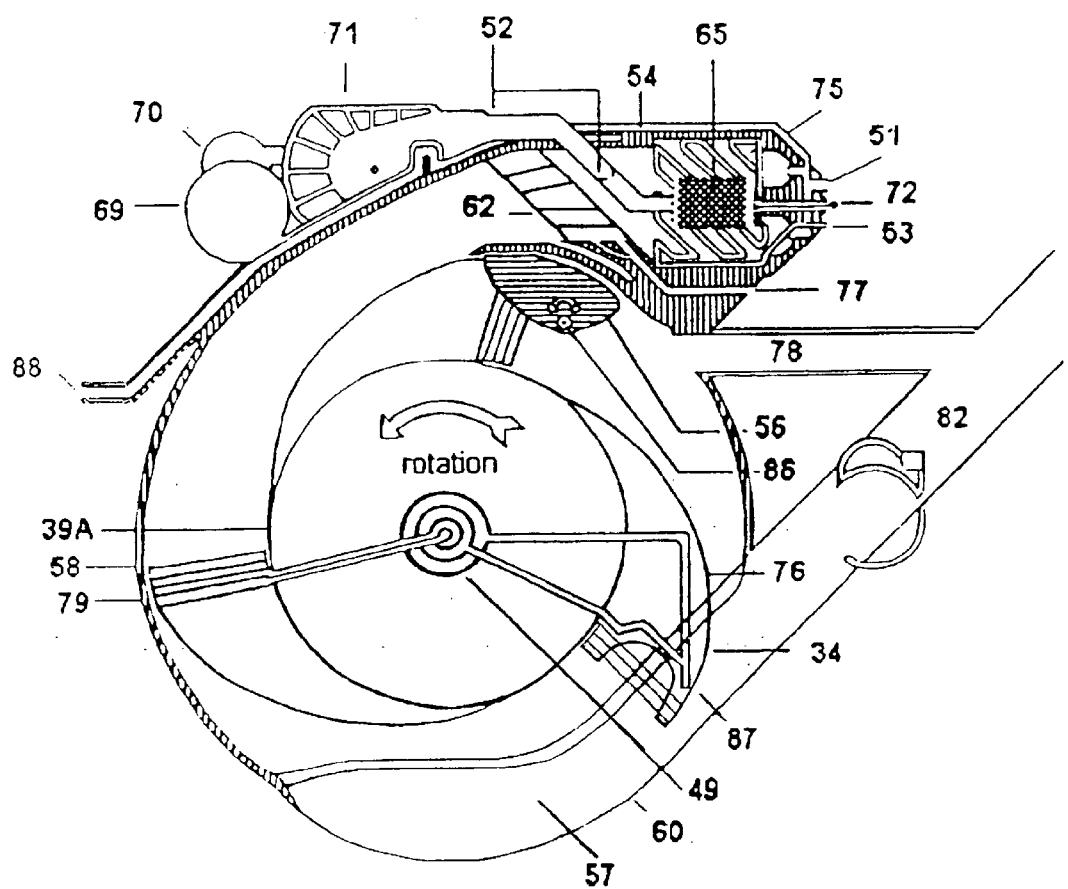
Figure 10:
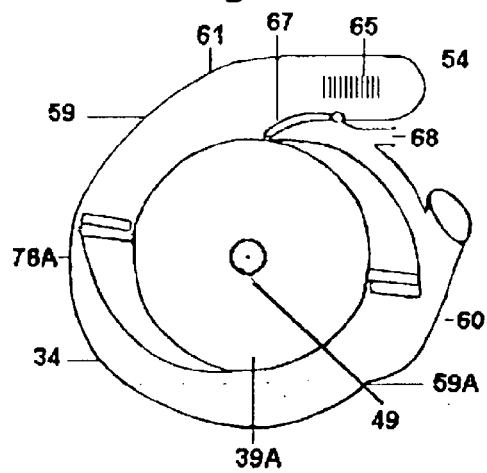
Figure 11:
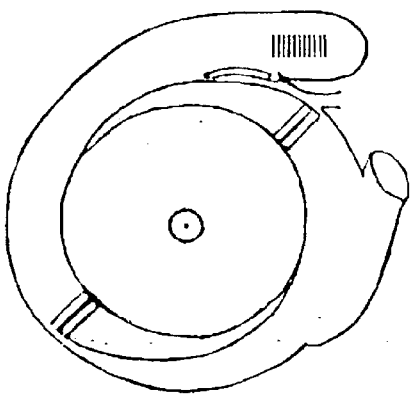
Figure 12:
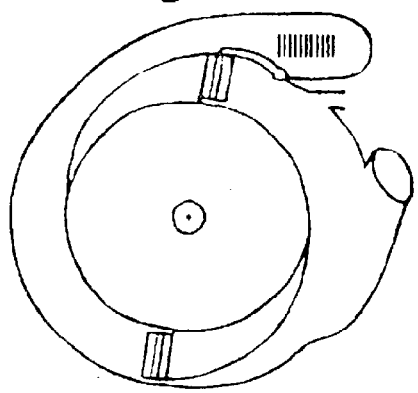
Figure 13:
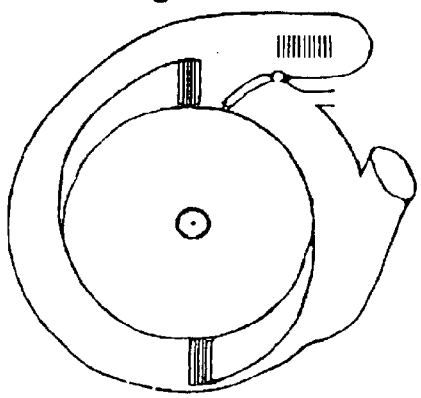
Figure 14:
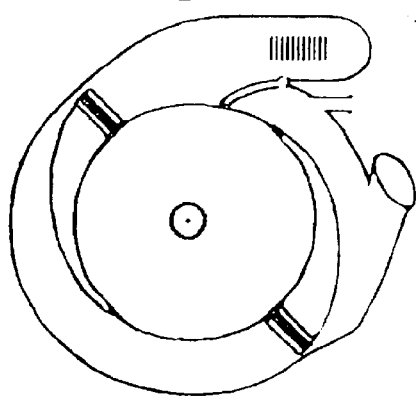
Figure 15:
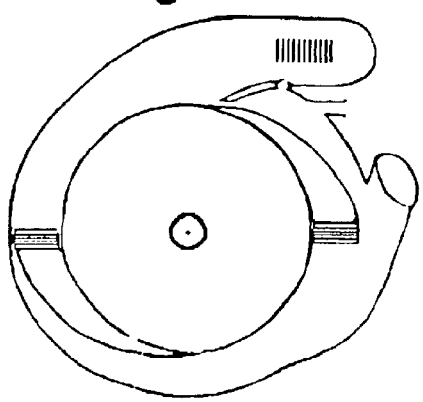

FIG. 6 the only way that this version differs from previous versions of cylindrical/cylindrical (round) internal combustion engines is that it is a double valve version. FIG. 7 differs from FIG. 6 only in that it is a two pistons version in a rectangular configuration. FIG. 8 this is a pump embodiment of the invention in a rectangular configuration also notice that the valve 67 is installed in a reverse manner that is it opens toward the approaching pistons 76A sloped back 41 which in yet other versions can extend to the top of the receding piston 76A and it may have a one way low pressure valve 66A also notice pump intake port 75 its position and shape can vary. FIG. 9 embodies the internal combustion engine in its round configuration as stated in earlier figures, what is new about this figure is the waste gas purge tube 78, valve pivot and water inlet 86, piston water supply 87, water recovery line 88 and stylized turbo charger 82.

FIGS. 10, 11, 12, 13, 14 and 15 illustrate the rotational sequence of the rotor 39A and the pistons 76 in relation to the position of the valve 67.

Figure 16:
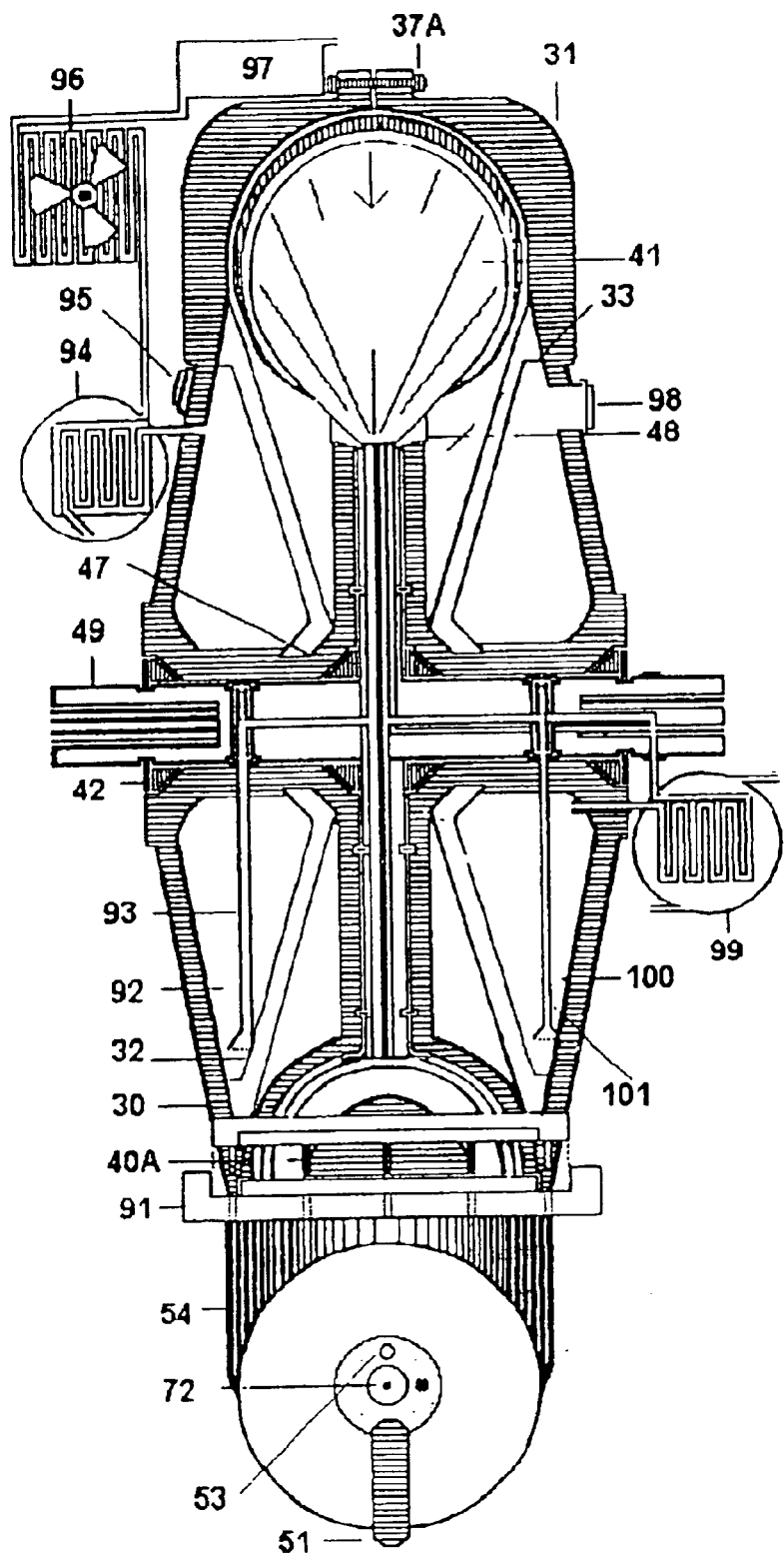

FIG. 16 is the front view of a preferred embodiment the internal combustion engine the reinforced combustor mount frame 91, internal coolant reservoir 92, includes coolant pick up tube 93, coolant filler cap 95, connected to the thermoelectric condenser 94, connected to radiator and fan 96, connected to expansion chamber 97, next to perimeter bolts 37a, oil filler cap 98 connects to oil reservoir 100, connected to oil cooling system 99, oil pickup tube 101, connected to axle shaft 99.

Figure 17:
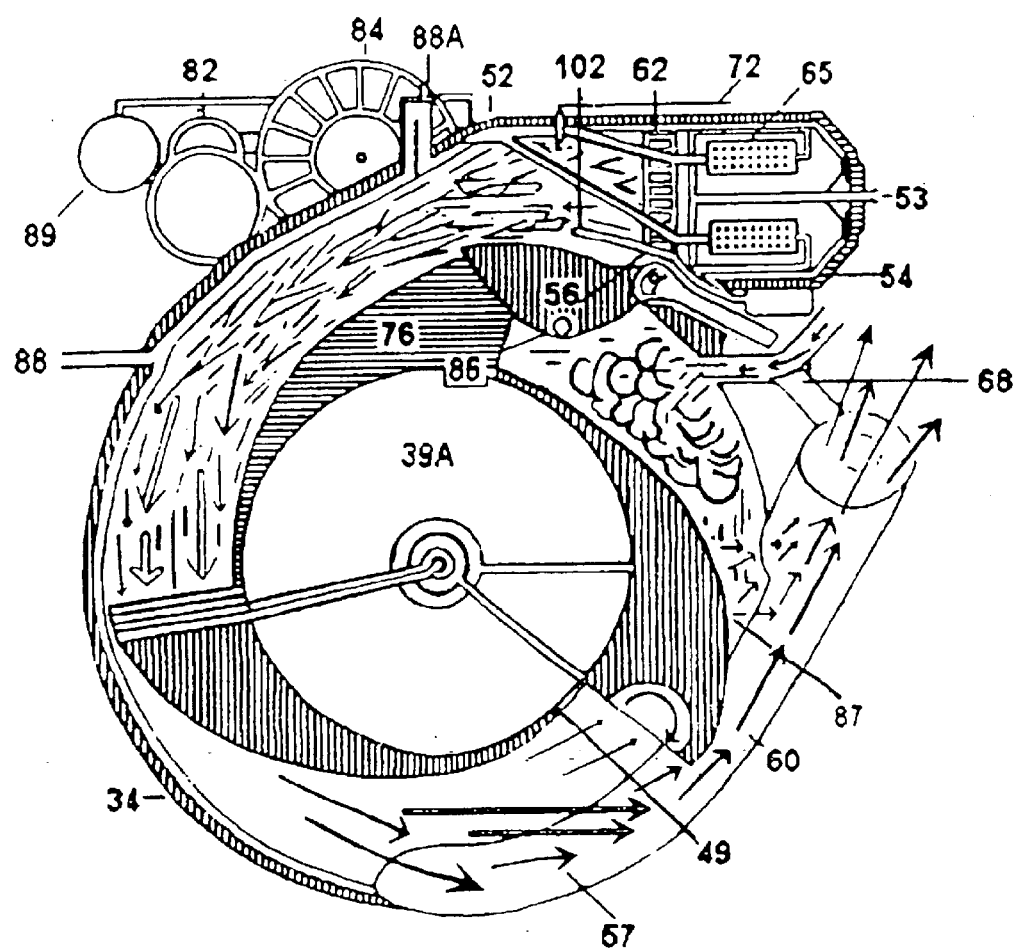

FIG. 17 is a representation of the continuous combustion engine embodiment of the invention as illustrated in FIG. 3 and FIG. 9 except that it additionally includes a valve shield 102 within the combustor 54, a valved fresh air/exhaust purge 68 connected to the toroid cylinder 34 and a water or steam recovery line 88.

Figure 18:
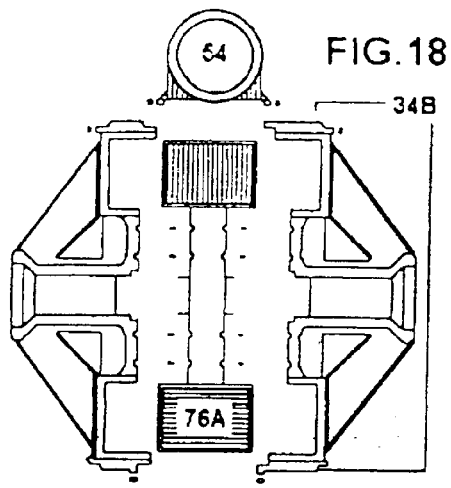
FIG. 18 is an exploded schematic isometric front view of the invention in a preferred embodiment as an internal combustion engine in a rectangular/rectangular configuration whose exterior may be air cooled. The cooling vanes 34C also act as bearing supports.

FIG. 18 is an exploded schematic isometric front view of the invention in a preferred embodiment as a continuous internal combustion engine in a rectangular toroid cylinder 34B configuration whose exterior may be air cooled utilizing an outer bearing support heat transfer structure 34C and a combustor 54.

Figure 19:
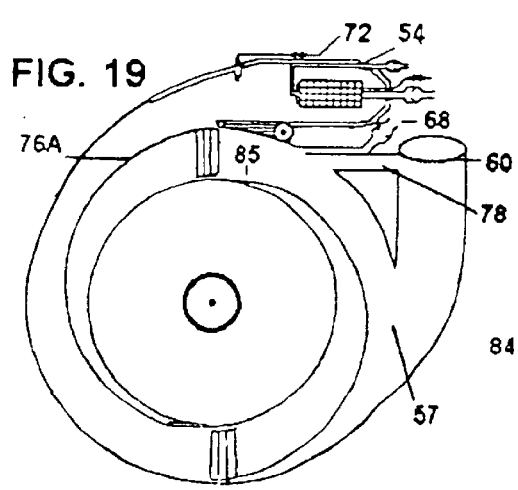
FIG. 19 is a side view of the above embodiment also showing that it is in a two piston 76A rotor 39A configuration and showing its fresh air 68 exhaust purge 78 system.

FIG. 19 is a side view of the above embodiment also showing that it is in a two piston 75A rotor 39A configuration and showing its fresh air 68 exhaust purge system 78.

Figure 20:
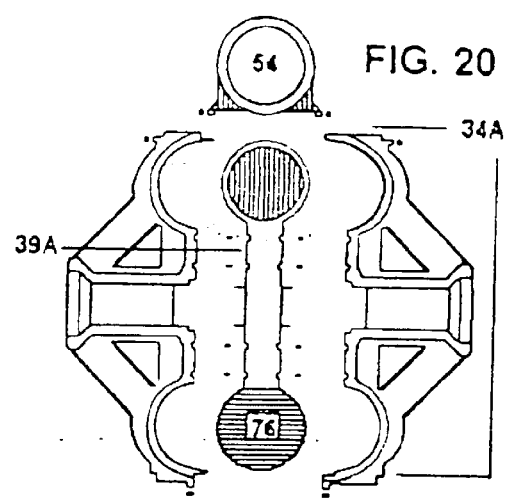
FIG. 20 is the same embodiment as FIG. 18 and FIG. 19 only that it is in a round cylinder configuration.

FIG. 20 is the same embodiment as FIGS. 18 and 19 except that it is in a round cylinder configuration.

FIG. 21 is also an internal combustion engine embodiment except that this version is an air breathing or air sucking version not force fed air as other continuous internal combustion models. Illustrated are a combustor 54 including a spark plug or electrode 72, a primary inner air supply line with check valves 52, a secondary air supply line with check valves 51, secondary air intake 51A. Also included are two valve actuator levers 83, a reversed exhaust purge valve 81, scaled pistons 84 and 76A, an exhaust port 57, an exhaust manifold 60 and two shock absorbing valve impact pads 85.

FIG. 22 is a rendition of the three piston 76 single rotor 39A round configuration of the engine embodiment illustrating a small turbocharger 89 connected to the combustor 54 and to the round toroid cylinder assembly 34A.

FIGS. 23,24,25 and 26 are different views of the same air cooled engine with three round pistons 75 connected to a rotor 39A encased in a whole round toroid cylinder assembly 34A with a combustor 54 and optional covers 90 showing finished view of this engine with ribbed external support heat transfer structures 31 and attached exhaust port 57 and exhaust manifold 60 to waste gas purge tube 78 also with side view.

FIGS. 27, 28, 29 and 30 illustrate the same as FIGS. 23, 24, 25 and 26 except in a rectangular toroid version with an extended exhaust port 57 and no purge tube 78.

FIG. 31 Depicts a two piston per rotor rotary expandable chamber device in an embodiment as a internal continuous combustion engine comprising a rectangular toroid cylinder 34B with an attached combustor 54 accumulator by pass neck 61 assembly, an intake fuel line with check valve 53 two separated spark plug igniters 72 an air or oxidizer intake line with check valve 52 an externally controlled isolating flap type valve 67B in its open position allowing the piston through while preventing the retrograde escape of the combustion flow. The valve is attached directly and controlled externally by a rollered lever 83 that may be spring loaded (not shown). Said lever 83 rides on an external cam 103 that as it turns raises and lowers the valve in synchronization with the approaching and passing of the pistons 76a allowing said piston 76A through yet immediately closing after it passes thus isolating the combustion gases that exit through exhaust port 57 and through exhaust manifold 60.

FIG. 32 Same as FIG. 31 except that the cam 103 has rotated and thus lowered the external rollered valve actuator control lever 83 closing the internal valve 67B while said valve 67B is ascending the gradient of the approaching sloped back piston 76A.

FIG. 33 Shows rigid simpler lighter cam 104 and external lever with roller 83 attached to valve pivot assembly with pivot stops 107.

FIG. 34 Shows free floating counterbalanced valve 67 with no external control in this version the valve 67 is opened by the upward pressure of the sloped back of the approaching piston 76A overcoming the constant pressure of the downward force of the fluid or combustion flow.

FIG. 35 Shows Flexible spring loaded shape changing governor type external control 106 for internal main valve 67 in full relaxed position that in turn forces the valve to fully open and close and function in a similar fashion to a regular cam 103 and allowing the valve 67 to close fully at lower revolutions for maximum torque also the valve control lever with roller 83 and valve pivot stops 107.

FIG. 36 Depicts same flexible spring loaded shape changing governor type external control 106 for internal main valve 67 in full extended position which in turn keeps the internal valve 67 open this control 106 at high revolutions utilizes centrifugal force to attain and maintain it's spherical shape as well as limitless shape increments in between thereby controlling the internal valve 67 through all changes in the speed of the revolutions permitting said valve 67 to open and close in the most efficient manner relative to the inventions speed minimizing its range of motion yet remaining unobstructive to the passing pistons while preventing the flow or combustion from taking a retrograde course to the exhaust before doing its work allowing for said valve to work as a fluidic amplifier. This type of external control for said internal valve allows for many increments in the position or shape of the cam that controls the lever that controls said valve allowing said valve to open and close to the extent necessary in order to maintain the load at any particular speed of revolutions of the invention also shown are valve control lever with roller 83 and valve pivot stops 107.

FIG. 37 Depicts an apparatus similar to FIG. 33 except that it additionally has rigid force down cam ramps 108 for the valve actuator 83 which forces the inner valve to close 67.

List of Reference Numerals

30. External support convex conical structure.
31. Ribbed external support ribbed heat transfer structure.
32. Internal support concave conical structure.
33. Ribbed internal support heat transfer and water jacket element.

34. Internal toroidal cylinder structure.
34A. Whole round toroidal cylinder assembly.
34B. Whole rectangular toroidal cylinder assembly.
34C. Outer bearing support/heat transfer structure.
35. Axel shaft area.
36. Outer bearing bevels (4).
36A. Inner bearing bevels.
37. Perimeter bolt holes.
37A. Perimeter bolts.
38. Outer cylinder ring seals grooves.
38A. Outer rotor ring seal grooves.
39. Rotor area.
39A. Rotor.
40. Piston cylinder area.
40A. Concave piston top.
41. Sloped piston back.
42. Bearing.
43. Bearing retainer.
44. Inner cylinder ring seal groove.
44A. Inner rotor ring seal groove.
45. Inner ring seal.
46. Outer ring seal.
47. Inner bearing.
48. Outer rotor seal.
49. Axle shaft.
50. Inner bearing retainer seal.
51. Secondary air supply line with check valves.
51A. Secondary air intake with check valves.
52. Primary inner air supply line with check valves.
53. Fuel supply lines with check valves.
54. Combustor/combustion chamber.
55. Timing gear valve actuator.
56. Valve for round toroid cylinder (with counter balanced actuator lever and or roller tip.
56A. Valve for round toroid cylinder in a double valve configuration.
57. Exhaust port.
58. Piston top with enhanced rings.
59. Top seal point.
60. Exhaust manifold.
61. Accumulator by-pass neck.
62. Diffuser.
63. Combustor water jacket.
64. Regeneratively cooled/heated fuel supply turbinals.
65. Inner stratified flashover reaction cage.
66. Combustor intake low pressure valves.
66A. One way low pressure valves.
67. Valve for rectangular toroid cylinder (with counter balanced actuator lever and or roller tipped.
67A. Valve for rectangular toroid cylinder in a double valve configuration.
67B valve for rectangular toroid cylinder
68. Fresh air exhaust and purge.
69. Reserve air tank.
70. 12v. Electric air pump.
71. Supercharger.
72. Spark plug/electrode.
73. Piston roller bearing.
74. Hybrid diffuser/auxiliary air/water cooled steam generator.
75. Pump intake port.
76. Round piston assembly can include enhanced piston rings, concave top and slopped backs.
76A. Rectangular piston assembly can include enhanced piston rings, concave top and slopped backs.
77. Water or coolant line.
78. Waste gas purge tube.
79. Lube oil ducts with piston rings and supply lines.
80. Enhanced piston rings.
81. Reversed exhaust purge valve.
82. Stylized turbo charger.
83. Valve actuator lever.
84. Scaled piston.
85. Shock absorbing valve impact pad.
86. Valve pivot and water inlet.
87. Piston water supply.
88. Water or steam recovery line.
89. Mini turbo charger.
90. Covers.
91. Reinforced combustor mount frame.
92. Internal coolant reservoir.
93. Coolant pick up tube.
94. Thermoelectric condenser.
95. Coolant filler cap.
96. Radiator and fan.
97. Expansion chamber.
98. Oil filler cap.
99. Oil cooling system.
100. Oil reservoir.
101. Oil pick up tube with filter.
102. Valve shield.
103. Solid or cast valve actuator cam
104. Rigid forged valve actuator cam
105. Electric screw type downward valve travel limiter
106. Flexible spring loaded shape changing governor type external control for internal main valve
107. Valve pivot assembly with pivot stops
108. Same as 103 except it additionally has a rigid force down cam ramps for the valve actuator which forces the valve closed.

What is claimed is:

1. A rotary piston continuous flow positive and dynamic displacement multiple purpose multiple fluid capable expansible chamber device comprising:

a hollow annular cylinder housing with a smooth inner surface;

a shaft having a longitudinal rotational axis aligned to a center of said annular cylinder housing;

a rotor mounted for rotation with said shaft;

at least one piston mounted radially on said rotor for circular movement in said housing when said rotor is rotated, each said piston having a conformably shaped outer peripheral surface in relation to said cylinder housing said piston having a sloping back as an inclined plane that gradually ramps from surface of said rotor to top of said piston;

an intake port through said housing to allow a working fluid to enter said hollow housing;

at least one isolating valve conformably shaped and associated with a respective piston and said hollow cylinder housing pivotably connected at one end to said housing upstream and before said intake port, another end of said isolating valve being in sliding contact with said conformably shaped outer peripheral surface of said associated piston and said rotor following said conformably shaped surface;

an accumulator area formed downstream of said valve starting at the downstream side of said intake port and ending at an initial seal point, said initial seal point formed at a point that said piston seals with said smooth inner surface of said hollow cylinder at the down stream end of said accumulator area and of said intake port;

an exhaust port for the discharge of said working fluid from said housing, said exhaust port located downstream of said initial seal point said accumulator area and said intake port on the periphery of said annular cylinder and after said piston and fluid's function is completed.

2. A rotary piston continuous flow positive and dynamic displacement expansible chamber device according to claim 1, wherein said pistons further comprise:
a plurality of piston rings mounted in ring grooves on said pistons.

3. A rotary piston continuous flow positive and dynamic displacement expansible chamber device according to claim 1, wherein said valve has means for the attachment of external controls said controls comprising:
a valve pivot shaft extending through to the outside of said cylinder area with means for attachment to
an external control lever thereto attached to
a rotating cam that is in synchronization with the rotation of said rotor and pistons, said lever rides on said external cam
a governor rotably connected to said rotating cam that as the revolutions increase said governor limits the extent of the closing travel of said valve in synchronization with the approaching and passing of said piston thus forcing said valve to progressively wave and flutter rhythmically, not closing completely, acting as a fluidic amplifier at higher revolutions, said external controls thus also prevent contact by said valve and said rotor and pistons thereby significantly reducing wear to said components.

4. A rotary piston continuous flow positive and dynamic displacement expansible chamber device according to claim 2, wherein said valve has means for the attachment of external controls, said controls comprising:
a valve pivot assembly with means for attachment to
an external control lever attached to
a rotating cam that is in synchronization with the rotation of said rotor and pistons, said lever rides on said external cam
a governor that limits the extent of the closing travel of said valve in synchronization with the approaching and passing of said piston thus forcing said valve to act as a fluidic amplifier at higher revolutions, said external controls thus preventing contact by said valve and said rotor and pistons preventing excessive wear to said components.

5. A rotary piston continuous flow positive and dynamic displacement expansible chamber device according to claim 1, wherein said valve is spring loaded in the closed position and reversed horizontally in position relative to said valve and relative to the rotation of said rotor and at least one approaching piston making said valve's leading in sliding contact edge face said piston's sloping back, said exhaust port is located just downstream along the periphery of said hollow annular cylinder housing relative to said intake port and to the rotation and travel of said rotor and said piston and said working fluid's flow, said intake port is located upstream and on the opposite side of said valve near the fixed pivoting position of said valve.

6. A rotary piston continuous flow positive and dynamic displacement expansible chamber device according to claim 5, wherein said pistons further comprise:
a plurality of piston rings mounted in ring grooves on said pistons.

7. A rotary piston continuous flow positive and dynamic displacement expansible chamber device according to claim 5, wherein said conformably shaped isolating valve further comprises:
a roller on its underside suspending said valve at close tolerance above said rotor and pistons, said roller suspending said valve at close tolerance above said rotor and pistons thereby minimizing friction and wear to said components.

8. A rotary piston continuous flow positive and dynamic displacement expansible chamber device according to claim 2, wherein said valve further comprises:
a spring that keeps said valve pressed against said conformably shaped rotor and pistons even in the absence of said fluid flow.

9. A rotary piston continuous flow positive and dynamic displacement expansible chamber device according to claim 1 wherein said conformably shaped isolating valve further comprises:
a roller on its underside suspending said valve at close tolerance above said rotor and pistons, said roller suspending said valve at close tolerance above said rotor and pistons, thereby, minimizing friction and wear to said components.

10. A rotary piston continuous flow positive and dynamic displacement expansible chamber device according to claim 2 wherein said conformably shaped isolating valve further comprises:
a roller on its underside suspending said valve at close tolerance above said rotor and pistons, said roller suspending said valve at close tolerance above said rotor and pistons thereby minimizing friction and wear to said components.

11. A continuous internal combustion positive and dynamic displacement passive compression compound cycle multiple fuel capable rotary engine comprising:
a rotary piston continuous flow dynamic displacement expansible chamber device comprising:
a hollow annular cylinder housing with a smooth inner surface;
a shaft having a longitudinal rotational axis aligned to a center of said annular cylinder housing;
a rotor mounted for rotation with said shaft; at least one piston mounted radially on said rotor for circular movement in said housing when said rotor is rotated, each said piston having a conformably shaped outer peripheral surface in relation to said cylinder housing said piston having a sloping back as an inclined plane that gradually ramps from the surface of said rotor to top of said piston;
an intake port through said housing to allow a working fluid to enter said hollow housing;
at least one isolating valve conformably shaped and associated with a respective piston and said hollow cylinder housing pivotably connected at one end to said housing upstream and before said intake port, another end of said isolating valve being in sliding contact with said conformably shaped outer peripheral surface of said associated piston and said rotor following said conformably shaped surface;
an accumulator area formed downstream of said valve starting at the downstream side of said intake port and ending at
an initial seal point, said initial seal point formed at a point that said piston seals with said smooth inner surface of said hollow cylinder at the down stream end of said accumulator area and of said intake port;

an exhaust port for the discharge of said working fluid from said housing, said exhaust port located downstream of said initial seal point said accumulator area and said intake port on the periphery of said annular cylinder and after the fluid's function is completed;

a combustor mounted over said intake port allowing for combustion gases to be channeled into said toroid cylinder, said combustor comprising;

a means for attachment of fuel and air supply lines and means for igniting said mixture.

12. A rotary piston continuous flow dynamic displacement continuous internal combustion engine according to claim 11, wherein said pistons further comprise:

a plurality of piston rings mounted in ring grooves on said pistons.

13. A rotary piston internal continuous combustion dynamic displacement engine according to claim 11, wherein said device has means for attaching;

a pressurizing air canister to the air lines entering its combustor supplying start up air for combustion negating the need for an electric starter.

14. A rotary piston internal continuous combustion dynamic displacement engine according to claim 12, wherein said device has means for attaching;

a pressurizing air canister to the air lines entering its combustor supplying start up air for combustion negating the need for an electric starter.

15. A rotary piston internal continuous combustion dynamic displacement engine according to claim 11, wherein said combustor comprises:

a precombustion chamber also known as an inner stratified flashover reaction cage in its concentric configuration and a means for attachment of fuel and air supply lines and means for igniting said mixture.

16. A rotary piston internal continuous combustion dynamic displacement engine according to claim 12, wherein said combustor comprises:

a precombustion chamber and a means for attachment of fuel and air supply lines and means for igniting said mixture.

17. A rotary piston internal continuous combustion dynamic displacement engine according to claim 11, wherein said conformably shaped isolating valve further comprises:

a roller on its underside suspending said valve at close tolerance above said rotor and pistons, thereby minimizing friction and wear to said components.

18. A rotary piston internal continuous combustion dynamic displacement engine according to claim 11, wherein said exhaust port has means for attaching;

a turbo charger for supplying air to said combustor.

19. A rotary piston internal continuous combustion dynamic displacement engine according to claim 11, wherein said valve further comprises:

a spring that keeps said valve pressed against said conformably shaped rotor and pistons even in the absence of said combustion flow.

20. A rotary piston internal continuous combustion dynamic displacement engine according to claim 12, wherein said valve further comprises and has means for the attachment of external controls, said controls comprising:

a valve pivot assembly with means for attachment to an external control lever attached to a rotating cam that is in synchronization with the rotation of said rotor and pistons, said lever rides on said external cam;

a governor that limits the extent of the closing travel of said valve in synchronization with the approaching and passing of said piston thus forcing said valve to act as a fluidic amplifier at higher revolutions, said external controls thus preventing contact by said valve and said rotor and pistons preventing excessive wear to said components.

21. A rotary piston internal continuous combustion dynamic displacement engine according to claim 11, wherein said combustor further comprises:

a diffuser located after said combustor in said accumulator area that directs combustion while aiding compression due to the reduction in said flow causing increases in pressure.

* * * * *